United States Patent
Schenkl (10) Patent No.: US 11,249,012 B2
(45) Date of Patent: Feb. 15, 2022

(54) DOMESTIC LAUNDRY-WASHING APPLIANCE OR DISHWASHER AND OPTICAL SENSOR THEREFOR

(71) Applicant: emz-Hanauer GmbH & Co. KGaA, Nabburg (DE)

(72) Inventor: Johann Schenkl, Bodenwoehr (DE)

(73) Assignee: EMZ-HANAUER GMBH & CO. KGAA, Nabburg (DE)

( * ) Notice: Subject to any disclaimer, the term of this patent is extended or adjusted under 35 U.S.C. 154(b) by 22 days.

(21) Appl. No.: 16/838,082

(22) Filed: Apr. 2, 2020

(65) Prior Publication Data

US 2020/0319092 A1    Oct. 8, 2020

(30) Foreign Application Priority Data

Apr. 3, 2019    (DE) ............... 10 2019 002 447.8

(51) Int. Cl.
   *G01N 21/25*    (2006.01)
   *G05B 19/042*    (2006.01)
   *G01N 21/59*    (2006.01)
   (Continued)

(52) U.S. Cl.
   CPC ........ *G01N 21/255* (2013.01); *A47L 15/0018* (2013.01); *A47L 15/0021* (2013.01);
   (Continued)

(58) Field of Classification Search
   CPC .. A47L 15/0018; A47L 15/0021; A47L 15/44; A47L 2501/00; A47L 2501/30; D06F 33/00; D06F 34/00; D06F 34/14; D06F 34/22; D06F 34/28; D06F 35/00; D06F 39/00; D06F 39/004; D06F 39/02;
   (Continued)

(56) References Cited

U.S. PATENT DOCUMENTS 7,924,424 B2 *    4/2011    Erickson ............. A61M 5/1684
                                                                356/432
9,709,505 B2 *    7/2017    Choi ..................... G01N 21/85
(Continued)

FOREIGN PATENT DOCUMENTS

DE    19806559 A1    8/1999
DE    19806560 A1    8/1999
(Continued)

OTHER PUBLICATIONS

DE examination report in priority application DE 102019002447.8; dated Dec. 4, 2019.

*Primary Examiner* — Crystal J Barnes-Bullock
(74) *Attorney, Agent, or Firm* — Hayes Soloway PC (57) ABSTRACT

A domestic laundry-washing appliance including an optical measuring device for obtaining measured values which are representative of a spectral transmission signature of a washing liquid used during operation of the laundry-washing appliance for cleaning textiles, and a control device which is adapted to categorise a cleaning agent contained in the washing liquid in respect of its chemical properties on the basis of the spectral transmission signature obtained, and to control the operation of the laundry-washing appliance in dependence on the categorisation result. The categorisation result can indicate, for example, a distinction between a heavy-duty detergent containing bleach and another bleach-free detergent.

21 Claims, 4 Drawing Sheets

(51) Int. Cl.
*G01N 21/49* (2006.01)
*G01N 21/17* (2006.01)
*A47L 15/44* (2006.01)
*A47L 15/00* (2006.01)
*D06F 33/00* (2020.01)
*D06F 34/22* (2020.01)
*D06F 39/02* (2006.01)
*D06F 34/28* (2020.01)
*D06F 34/14* (2020.01)
*D06F 105/52* (2020.01)
*D06F 103/22* (2020.01)

(52) U.S. Cl.
CPC .............. *A47L 15/44* (2013.01); *D06F 33/00* (2013.01); *D06F 34/14* (2020.02); *D06F 34/22* (2020.02); *D06F 34/28* (2020.02); *D06F 39/02* (2013.01); *G01N 21/17* (2013.01); *G01N 21/49* (2013.01); *G01N 21/59* (2013.01); *G05B 19/0426* (2013.01); *A47L 2501/30* (2013.01); *D06F 2103/22* (2020.02); *D06F 2105/52* (2020.02); *G05B 2219/2633* (2013.01)

(58) Field of Classification Search
CPC .. D06F 39/08; D06F 2103/22; D06F 2105/52; D06F 2105/56; G01N 21/17; G01N 21/31; G01N 21/49; G01N 21/59; G01N 21/255; G05B 19/0426; G05B 2219/2633
See application file for complete search history.

(56) References Cited

U.S. PATENT DOCUMENTS

| | | | |
|---|---|---|---|
| 10,407,821 | B2* | 9/2019 | Clowes .................. D06L 4/50 |
| 2002/0088502 | A1* | 7/2002 | Van Rompuy ........ A47L 15/006 141/1 |
| 2013/0278921 | A1 | 10/2013 | Choi et al. |
| 2017/0342634 | A1* | 11/2017 | Kuniavsky .............. D06F 34/18 |
| 2018/0265825 | A1* | 9/2018 | Park .................... C11D 11/0017 |
| 2020/0116627 | A1* | 4/2020 | Kessler ................. G01J 3/0272 |
| 2020/0134806 | A1* | 4/2020 | Kessler .................... G06T 7/12 |
| 2021/0032793 | A1* | 2/2021 | Kessler .................. D06F 34/05 |
| 2021/0040667 | A1* | 2/2021 | Kessler .................. D06F 34/14 |

FOREIGN PATENT DOCUMENTS

| | | | | |
|---|---|---|---|---|
| DE | 102004055019 | A1 | | 5/2006 |
| DE | 102007011119 | A1 | | 9/2008 |
| DE | 102008056701 | A1 | | 6/2010 |
| DE | 20101002589 | A1 | | 9/2011 |
| DE | 102010026068 | A1 | | 1/2012 |
| DE | 102011102627 | A1 | | 1/2012 |
| DE | 102016212985 | A1 | * | 1/2018 ........... A47L 15/449 |
| DE | 102016217031 | A1 | | 3/2018 |
| JP | 2009028113 | A | | 2/2009 |
| JP | 2009240546 | A | | 10/2009 |
| WO | WO-2018011171 | A1 | * | 1/2018 ............ D06F 33/37 |

* cited by examiner

DOMESTIC LAUNDRY-WASHING APPLIANCE OR DISHWASHER AND OPTICAL SENSOR THEREFOR

BACKGROUND OF THE INVENTION

1. Field of the Invention

The present invention relates generally to a domestic laundry-washing appliance and to an optical sensor therefor. In particular, the invention is concerned with categorising a detergent used in the laundry-washing appliance for the purpose of cleaning textiles in respect of its chemical properties and with controlling the operation of the laundry-washing appliance in dependence on the determined detergent category.

2. Description of the Prior Art

In domestic washing machines, detergents which differ from one another in terms of their chemical properties are used, which detergents are suitable for different types of laundry. Particularly suitable for light-coloured, in particular white, boil-wash laundry (for example bed sheets, tablecloths or towels) are so-called heavy-duty detergents, which are characterised by the presence of optical brighteners or/and bleaching agents, which are to ensure that the laundry retains its light, bright colour shade and does not become yellowish or grey. For coloured laundry, on the other hand, a so-called colour detergent is generally recommended, which usually does not contain optical brighteners or bleaching agents and is to maintain the colour intensity of the laundry without the colours bleaching out over time. In addition, so-called mild detergents are also common, which are suitable in particular for delicate materials such as wool or silk.

It is desirable always to wash laundry with the detergent that is suitable for the type of laundry in question. Although it may not be harmful to use a mild detergent for boil-wash or coloured laundry by mistake, it is to be expected that the desired cleaning effect will not be achieved. Conversely, it may even be harmful for delicate textiles if a heavy-duty detergent is used by mistake.

US 2013/0278921 A1 describes the use of a so-called turbidity sensor in a washing machine in order to determine whether a powdered detergent or a liquid detergent has been added to the washing water of the washing machine. An embodiment is thereby described in which a light-transmitting part of the turbidity sensor is able to emit light of different wavelengths, namely a wavelength in the IR range and a wavelength in the visible range.

A turbidity sensor which is able to transmit light in the IR range and in the visible range onto a measurement section is further described in JP 2009-240546 A. By means of the measured values of the turbidity sensor, the type of dirt (grease or other) on dishes in a dishwashing machine is to be detected.

A turbidity sensor working with the primary colours red, green and blue for use in a washing machine is additionally described in JP 2009-028113 A.

DE 198 06 559 A1 discloses a multicolour turbidity sensor for use in a dishwasher. The colours of the turbidity sensor include inter alia IR light.

SUMMARY OF THE INVENTION

It is an object of the invention to provide a domestic laundry-washing appliance which is capable of detecting the (chemical) category of a detergent which has been introduced and of controlling the operation of the laundry-washing appliance in dependence on the determined detergent category.

It is a further object of the invention to provide an optical sensor which is provided for installation in a domestic laundry-washing appliance and is equipped with a suitable measuring device which, by means of optical measurements, allows measured values to be obtained, on the basis of which the (chemical) category of a detergent can be determined.

According to some embodiments, the invention provides a domestic laundry-washing appliance which comprises an optical measuring device and a control device. The optical measuring device serves to obtain measured values which are representative of a spectral transmission signature of a washing liquid used during operation of the laundry-washing appliance for cleaning textiles. The control device is adapted to categorise a cleaning agent (detergent) contained in the washing liquid in respect of its chemical properties on the basis of the spectral transmission signature obtained, and to control the operation of the laundry-washing appliance in dependence on the categorisation result.

In some embodiments, the laundry-washing appliance is a washing machine with only a washing function. In other embodiments, the laundry-washing appliance is a so-called washer-dryer which, as well as providing a washing function, additionally provides a function as a laundry dryer. The invention can be used not only in washing appliances for laundry but, for example, also in domestic dishwashing machines. The term laundry-washing appliance can therefore be generalised to water-bearing domestic cleaning appliance, wherein this cleaning appliance can be in the form of, for example, a laundry-washing appliance or—as explained—in the form of a dishwasher. In this respect, the term washing function can be generalised to a cleaning function for articles of very different types (e.g. laundry, dishes).

The spectral transmission signature denotes information which characterises the light transmission of the washing liquid at different wavelengths. The optical measuring device is capable of transmitting light of different wavelengths or different wavelength ranges onto a measurement section which leads through the washing liquid (more precisely, onto a measurement section which leads through a space through which the washing liquid passes during operation of the laundry-washing appliance) and, for each of the wavelengths or each of the wavelength ranges, to measure the degree of attenuation of the light intensity experienced by the light along the measurement section. The greater the attenuation, the lower the transmission. Conversely, the less the light is attenuated on the measurement section, the greater the transmission. A measure of the transmission can accordingly be obtained by relating the light intensity received at the end of the measurement section to the light intensity introduced into the measurement section. At the level of electrical quantities, a measure of the transmission can be obtained by relating the detection current emitted by a light detector (e.g. photodiode) to the feed current of a light transmitter (e.g. light-emitting diode). The transmission signature can be represented by a number of values which are each obtained for a different wavelength or a different wavelength range from the determination of the quotient of a received quantity to a transmitted quantity, wherein the transmitted quantity is representative of the light intensity transmitted onto the measurement section and the received quantity is representative of the light intensity still present at the end of the measurement section.

In some embodiments, it may be sufficient if the transmission signature represents transmission values for only two different wavelengths or wavelength ranges. In other embodiments, the transmission signature can be more comprehensive and represent transmission values for more than two, for example for three or four, different wavelengths or wavelength ranges.

The invention is based on the finding that, in the field of the cleaning agents (detergents) that are conventional for domestic laundry-washing appliances, different detergent types can have different transmission spectra which differ in a characteristic manner from one another. Where mention is made herein of different detergent types, this refers to the chemical properties of the detergents, not to the dosage form (liquid, powder, gel). It has in particular been shown within the scope of the invention that the transmission spectrum (seen over a range from UV wavelengths to IR wavelengths, e.g. from about 200 nm to about 1200 nm) of many heavy-duty detergents often differs in a characteristic manner from the transmission spectrum of colour detergents and mild detergents. For example, it has been found that, in a number of the heavy-duty detergents available on the market, the transmission shows a significant fall in a wavelength range between about 500 nm and about 700 nm, which cannot be observed in colour detergents and mild detergents available on the market. In the UV range into the lower range of the visible spectrum too, significant differences in terms of transmission behaviour can be observed in some heavy-duty detergents available on the market as compared with common colour detergents and mild detergents. As explained at the beginning, heavy-duty detergents (sometimes also referred to as universal detergents) generally contain optical brighteners or/and bleaching agents, while such optical brighteners and bleaching agents are usually absent from colour detergents and mild detergents.

Optical brighteners are intended to promote the absorption of UV light and the fluorescence-related emission of blue light. Bleaching agents are intended to break down dye molecules by oxidation (e.g. by means of hydrogen peroxide) and have a sterilising action. It is supposed that the brightening agents and bleaching agents are primarily responsible for the mentioned significant differences in the transmission spectrum between heavy-duty detergents on the one hand and colour and mild detergents on the other hand. At the same time, it has been found that, in the IR range, the transmission spectrum of many heavy-duty detergents does not exhibit any significant differences, or at any rate considerably less significant differences, to the transmission spectrum of common colour and mild detergents.

The invention utilises the mentioned finding in that, at suitably chosen wavelengths or/and wavelength ranges, measured values representative of the transmission of the washing liquid are determined and, on the basis of the transmission signature of the washing liquid so obtained, a conclusion is drawn about the type of detergent contained therein. For this purpose, the determined transmission signature can be compared with suitable reference signatures which have been determined beforehand and are stored in a memory of the control device, for example in table form or via formulae. For example, the control device can determine a degree of similarity of the determined transmission signature to one or more reference signatures and, on the basis of the calculated degree of similarity, categorise the detergent contained in the washing liquid, that is to say classify it, for example, as a heavy-duty detergent or a non-heavy-duty detergent. Where mention is made herein of a comparison of the transmission signature obtained with a reference signature, the comparison can comprise, for example, an absolute value comparison of spectral components of the transmission signature with corresponding spectral components of the reference signature or/and a comparison of at least one amplitude ratio of different spectral components of the transmission signature with the amplitude ratio of corresponding spectral components of the reference signature.

In some embodiments, the washing liquid on which the optical measuring device performs its measurements with the aim of determining the transmission signature is a water/detergent mixture, that is to say the detergent is diluted with water. In other embodiments, the washing liquid consists only of the undiluted detergent, as is sold to the consumer. The optical measuring device can accordingly (in some embodiments) perform its signature measurements directly on the detergent or (in other embodiments) it can perform the signature measurements on a liquid medium which only forms when the detergent is added to water which has been introduced into the laundry-washing appliance. In the latter case, the washing liquid measured by the optical measuring device can be, for example, the washing water (liquor) contained in a laundry tub (liquor container) of the laundry-washing appliance or can be derived from that washing water. Alternatively, the measured washing liquid can be a mixture which forms when a dosing chamber containing the detergent is flushed and, for example, is to be found in a detergent dosing channel leading from the dosing chamber to the liquor container. The dosing chamber can be formed, for example, in a dosing drawer which can be filled with detergent by the user as required. In the former case (signature measurement directly on the detergent), the optical measuring device can perform the signature measurement, for example, where the detergent is stored in a storage receptacle in the laundry-washing appliance (where it is a washing gel or a liquid detergent) or where the detergent is removed from such a storage receptacle in a dosed manner by means of a dosing device.

Laundry-washing appliances are now obtainable on the market which can be fitted with a storage receptacle in which a detergent can be stored in an amount sufficient for a large number of washing operations. Moreover, laundry-washing appliances are obtainable on the market which can be fitted with a plurality of such storage receptacles (for example two) for in each case a different detergent. In such cases it can be provided to perform the signature measurement at a point at which the detergent is still undiluted, that is to say has not been mixed with water, or the signature measurement can be carried out after detergent has been removed from the storage container (or from one of the storage containers) and after water has been added to the detergent which has been removed.

In some embodiments, the control device is adapted to categorise a cleaning agent contained in the washing liquid in respect of the presence of an optical brightener or/and of a bleaching agent on the basis of the spectral transmission signature obtained.

In some embodiments, the control device is adapted to classify a cleaning agent contained in the washing liquid into one of a plurality of cleaning agent categories on the basis of the spectral transmission signature obtained, wherein the cleaning agent categories include at least the categories heavy-duty detergent and colour detergent.

In some embodiments, the control device is adapted to categorise a cleaning agent contained in the washing liquid in respect of its chemical properties on the basis of the relative amplitude ratio of different spectral components of the spectral transmission signature obtained. For example, the control device can relate the spectral amplitude of the transmission signature at a first wavelength at which the transmission spectra of different detergent types, in particular those with brighteners or/and bleaching agents and those without, differ significantly to the spectral amplitude of the transmission signature at a second wavelength at which the transmission spectra of the detergent types in question do not differ significantly. It will be appreciated that the control device can alternatively or in addition calculate the relative ratio of spectral amplitudes of the transmission signature which belong to wavelengths at which the transmission spectra of the detergent types in question differ significantly.

In some embodiments, the control device is adapted to test the spectral transmission signature obtained in respect of the presence or absence of a significant local amplitude trough in the visible wavelength range or/and in the ultraviolet wavelength range and to categorise a cleaning agent contained in the washing liquid in dependence on the presence or absence of such a significant local amplitude trough. These embodiments are based on the finding that a significant difference resulting from the chemical composition can manifest itself in the case of cleaning agents for washing machines or dishwashers in that the transmission spectrum of a first cleaning agent at a given concentration thereof in water can exhibit a significant local minimum (i.e. minimum transmission) in the visible wavelength range (for example between about 500 nm and about 700 nm) or/and in the ultraviolet wavelength range (for example between about 250 nm and about 380 nm), while the transmission spectrum of a second cleaning agent with a different chemical composition at the same given concentration in water specifically does not exhibit such a significant local minimum in the mentioned wavelength ranges. For example, with some heavy-duty detergents for washing machines on the market, a pronounced local transmission minimum can be found in a range, as a rough approximation, at about 600 nm, but such a local transmission minimum is not found with some colour detergents without optical brighteners and bleaching agents. On both sides of the local minimum (trough point), that is to say both towards shorter wavelengths and towards longer wavelengths, the spectral amplitude in such heavy-duty detergents increases significantly. An embodiment which tests a spectral transmission signature which has been obtained for the presence (or absence) of certain significant amplitude troughs can accordingly provide information about the type of detergent in question. The amplitude trough can also be referred to as a reversal point, at which the gradient of the transmission curve changes from positive to negative.

In some embodiments, the control device is adapted to relate the categorisation result to the type of wash program set on the laundry-washing appliance by the user and to effect a predetermined error action if the combination of the categorisation result and the set program type is determined by the control device to be an error combination. An error combination can be defined, for example, as the setting of a delicate wash program (for wool, silk or the like) on the laundry-washing appliance in combination with the detection of a detergent that contains optical brighteners or/and bleaching agents (heavy-duty detergent). Such a combination of wash program and detergent category may be undesirable from the point of view of the user, because the brighteners or/and bleaching agents contained in the detergent may permanently damage clothing made of delicate material. Detecting that the user has set a delicate wash program on the laundry-washing appliance is cause for the control device to assume that the user has loaded delicate textiles into the laundry-washing appliance. Because of the potential risk of damage to the textiles, it may be expedient to take suitable preventive measures, if the control device at the same time detects that an unsuitable detergent, in particular a heavy-duty detergent, has been provided for carrying out the wash program. The predetermined error action can comprise, for example, at least one of the following actions: delivery of a visual warning, delivery of an acoustic warning, interruption, termination or prevention of the performance of the set wash program.

Alternatively or in addition, the control device is adapted in some embodiments to control a dosing operation for at least one cleaning agent on the basis of the categorisation result. It has been explained above that there are washing machines on the market which can be fitted by the user with a plurality of storage containers for different detergents. It cannot be ruled out that the user will mistakenly insert the detergents into the laundry-washing appliance in the incorrect arrangement (if a specific arrangement is specified by the manufacturer). In such a situation, it is expedient if a dosing device of the laundry-washing appliance does not remove detergent from the storage containers solely on the basis of an arrangement of the containers specified by the manufacturer but is capable of suitably modifying the dosing operation if it is determined that the storage containers have not been inserted into the laundry-washing appliance in the arrangement specified by the manufacturer. However, it can also be expedient to control a detergent dosing operation on the basis of the categorisation result independently of the possibility of fitting the laundry-washing appliance with a plurality of storage containers for different detergents. For example, it is conceivable that, in the event of a colour wash program being set on the laundry-washing appliance and a bleach-containing detergent (i.e. heavy-duty detergent) being detected at the same time, the control device effects a reduction in the amount of detergent which is added to the liquor in the liquor container (reduction compared to a case in which a bleach-free detergent is detected). Colour laundry is not generally at risk from a heavy-duty detergent, so that it may be expedient not to stop the performance of the colour wash program. It may, however, be expedient to use a smaller dose of the heavy-duty detergent than in the case of a colour detergent.

In some embodiments, the optical measuring device is adapted to determine, for each of a plurality of wavelengths or/and wavelength ranges, a measured value which is representative of the optical transmission of the washing liquid at the wavelength or wavelength range in question.

In some embodiments, the optical measuring device comprises a plurality of individually controllable, different coloured light transmitters, in particular using LED technology, and a light detector arranged to detect the light of each of the light transmitters. The control device is adapted to control the light transmitters to emit light in a temporally offset manner relative to one another and to determine the spectral transmission signature of the washing liquid on the basis of the detection values of the light detector. Accordingly, in these embodiments, a single light detector can be used, which can be in the form of a broadband detector whose detection sensitivity extends over the wavelengths of all the light transmitters. It is conceivable that, in such a case, the detection sensitivity of the broadband detector is different for different wavelengths. Any wavelength-dependence of the detection sensitivity can be taken into consideration, for example, by correspondingly configuring an evaluation program in the control device which is used for evaluating the measured values. Operating the light transmitters in a temporally offset manner ensures that spectrally resolved intensity values can nevertheless be measured.

In some embodiments, all the light transmitters of the plurality of light transmitters have a mutual spectral distance of their main transmission wavelength of at least 80 nm or at least 100 nm or at least 150 nm.

In some embodiments, the plurality of light transmitters comprises a light transmitter whose main transmission wavelength lies in an infra-red wavelength range starting at about 780 nm.

In some embodiments, the plurality of light transmitters comprises a light transmitter whose main transmission wavelength lies in an ultraviolet wavelength range up to about 380 nm.

In some embodiments, the plurality of light transmitters comprises at least one light transmitter whose main transmission wavelength lies in a visible wavelength range between about 380 nm and about 780 nm.

In some embodiments, the plurality of light transmitters comprises two light transmitters whose main transmission wavelengths each lie at a different location in the visible wavelength range.

At least two light transmitters of the plurality of light transmitters can be mutually spectral overlap-free.

In some embodiments, at least two light transmitters of the plurality of light transmitters, in particular all the light transmitters, are combined in a multichip light-emitting diode component. The multichip light-emitting diode component is a single discrete component which can be mounted on a printed circuit board and the individual chips of which (each of which forms a light-emitting diode) can be controlled individually. Multi-coloured LED structural elements using multichip technology are commercially available as such.

In some embodiments, the optical measuring device comprises a measurement housing which projects into a flushing space for the washing liquid, a printed circuit board arrangement which is arranged in the measurement housing and on which the plurality of light transmitters and the light receiver are mounted, and a light-guiding structure which is arranged in the measurement housing and made of a transparent material and which defines at least one first light inlet point, a first light outlet point, a second light inlet point and a second light outlet point. The plurality of light transmitters is so arranged relative to the light-guiding structure that the light of the plurality of light transmitters enters the light-guiding structure at the at least one first light inlet point and is guided therein to the first light outlet point. The light-guiding structure defines a light-measurement path which extends from the first light outlet point to the second light inlet point and from there, inside the light-guiding structure, to the second light outlet point. The light-measurement path additionally extends through the flushing space outside the measurement housing on a portion lying between the first light outlet point and the second light inlet point. The light receiver is additionally so arranged relative to the light-guiding structure that light emerging from the light-guiding structure at the second light outlet point strikes the light receiver.

Where mention is made herein of a flushing space for the washing liquid, it means a space through which the washing liquid is flushed when the laundry-washing appliance is used as intended, without a specific dynamics of the flushing being implied. The flushing space can, for example, be formed in a liquor container of the laundry-washing appliance, it can be formed by an auxiliary space which is branched off from the liquor container and into which the washing liquid from the liquor container passes, or it can be formed by a hose or pipe through which diluted or undiluted detergent is guided in the direction towards the liquor container. A storage chamber in which a detergent supply sufficient for a plurality of operating cycles of the laundry-washing appliance can be stored can also be a flushing space in this sense, since the storage chamber is also flushed by the detergent on filling and emptying.

In some embodiments, the light-guiding structure has a first light inlet point which is common to all the light transmitters of the plurality of light transmitters. In other embodiments, the light-guiding structure has a plurality of separate first light inlet points, each of which is associated with at least one different light transmitter of the plurality of light transmitters. All of these embodiments ensure that the light of each light transmitter is guided in the light-guiding structure to the first light outlet point, regardless of which first light inlet point is the light inlet point at which the light of the light transmitter in question enters the light-guiding structure, so that the light of all the light transmitters passes through the flushing space within substantially the same cross-sectional region. Local concentration variations of the detergent in the flushing space which can generally not be ruled out can thus largely be eliminated as a cause of measurement inaccuracies, because the light of each light transmitter follows substantially the same path within the flushing space. In the case of a total of two light transmitters, the light-guiding structure can be configured, for example, in the manner of a Y in the region before the first light outlet point, the top two Y legs of which Y each end at a first light inlet point and the bottom Y leg of which Y ends at the first light outlet point.

The inventive concept can—as explained—be used not only in laundry-washing appliances but also in domestic dishwashers. In dishwashers too, cleaning agents of different chemical compositions can be used. This is the case, for example, when the cleaning agent is composed of a plurality of chemical substances which can be removed in an individually determined amount from a respective substance supply, for example by means of an automatic dosing system. It is also the case when compositions of various chemical substances which have been compacted into a tablet form (so-called cleaning tabs) are used, wherein different chemical compositions can be present depending on the tablet. As with detergents for washing machines, cleaning agents for dishwashers can also exhibit characteristic differences in their transmission spectrum depending on their chemical composition. The expression cleaning agents for dishwashers is here to include not only agents containing surfactants but, for example, also rinse aids or dishwasher salts. Such substances too can exhibit characteristic differences in respect of their transmission spectrum, depending on their chemical properties. By means of transmission measurements at suitably chosen wavelengths it is possible to obtain meaningful spectral transmission signatures from which conclusions can be drawn about the chemical composition or the chemical properties in general of the cleaning agent used in a particular case.

According to some embodiments, the invention therefore further provides a domestic dishwasher comprising an optical measuring device for obtaining measured values which are representative of a spectral transmission signature of a cleaning liquid used during operation of the dishwasher for cleaning dishes, and a control device which is adapted to categorise a cleaning agent contained in the cleaning liquid in respect of its chemical properties on the basis of the spectral transmission signature obtained, and to control the operation of the dishwasher in dependence on the categorisation result. The determined category of the cleaning agent can be used, for example, to control the temperature of the washing liquor. If, for example, a cleaning agent containing enzymes is detected, the control device can be adapted to keep the temperature of the washing liquor at not more than a predetermined temperature (for example about 50° C.). Higher temperatures could destroy the enzymes or impair the action thereof. If, on the other hand, an enzyme-free cleaning agent is detected, the control device can be adapted to increase the temperature of the washing liquor above the predetermined temperature, for example up to about 70° C. It will be appreciated that other measures for controlling the operation of the dishwasher are conceivable.

According to some embodiments, the invention additionally provides an optical sensor for installation in a water-bearing domestic cleaning appliance. The cleaning appliance can be, for example, a washing machine or a dishwasher. The optical sensor comprises an optical measuring device for obtaining measured values which are representative of a spectral transmission signature of a cleaning liquid to be used during operation of the cleaning appliance, and a processor which is adapted to categorise a cleaning agent contained in the cleaning liquid in respect of its chemical properties on the basis of the spectral transmission signature obtained, and to provide a corresponding categorisation result. The processor can be adapted to cooperate with a separate main control unit of the cleaning appliance and to provide the categorisation result to the main control unit.

The invention will be explained in greater detail hereinbelow with reference to the accompanying drawings.

DETAILED DESCRIPTION OF THE INVENTION

Figure 1:
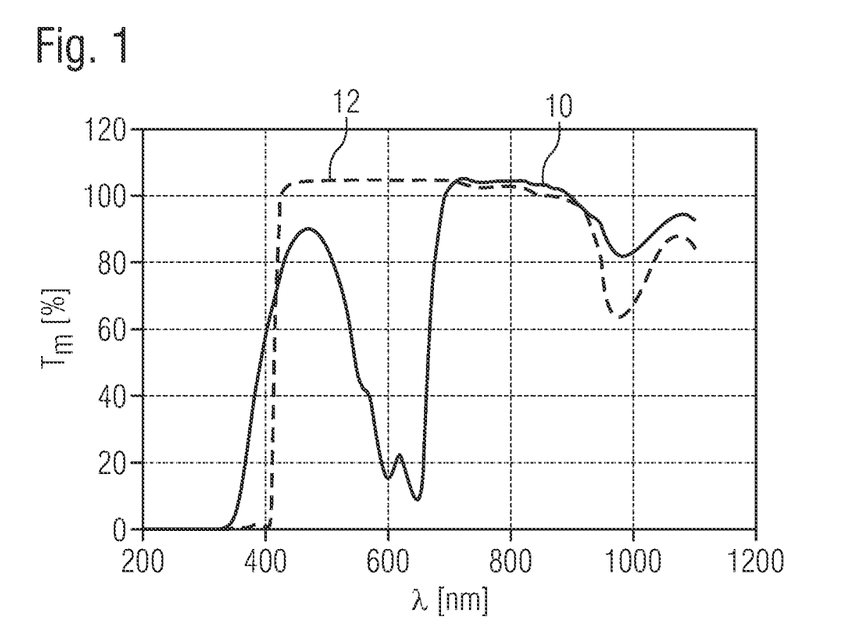
FIG. 1 shows exemplary transmission spectra of two different cleaning agents.

Reference will first be made to FIG. 1. In that figure, exemplary transmission spectra of two different cleaning agents in a wavelength range between about 200 nm and about 1100 nm are shown. The spectrum of a first cleaning agent is represented by a curve 10 and identified by a solid line, and the spectrum of a second cleaning agent is represented by a curve 12 and identified by a broken line. The first cleaning agent is, for example, a commercial heavy-duty detergent for domestic washing machines, while the second cleaning agent is a commercial colour detergent for domestic washing machines. The heavy-duty detergent usually differs from the colour detergent primarily in that it contains optical brighteners or/and bleaching agents. The two curves 10, 12 represent the same concentration of the cleaning agent in question, that is to say pure or in a defined relative proportion to water.

It will be seen in FIG. 1 that the curve 10 differs significantly from the curve 12. While both curves 10, 12 have a significant but weakly pronounced local minimum in an IR range between about 950 nm and about 1000 nm, the curve 10 associated with the first cleaning agent exhibits a further, highly pronounced fall in the transmission locally in a range between about 450 nm and about 700 nm, that is to say in the visible wavelength range. The exact numerical values of the wavelengths in question are not important; it is the significantly different qualitative profile of the transmission curves 10, 12 in the visible wavelength range, that is to say especially below the long-wave human limit of visibility of about 780 nm, that is of primary importance. While the transmission curve 12 exhibits a very strong and only slightly changeable transmission of the second cleaning agent into the blue range at about 400 nm, the transmission curve 10 of the first cleaning agent shows a significant drop in the transmission as a rough estimate in the yellow-green range. The spectral amplitude of the transmission curve 10 here falls into a prominent amplitude trough (at approximately 650 nm) and rises again significantly on both sides of that amplitude trough (wherein the rise is interrupted towards shorter wavelengths by a further, comparatively slight fall, which leads to a local secondary minimum of the transmission curve 10 at about 600 nm or just below).

While in the example shown in FIG. 1 the first cleaning agent exhibits considerably greater absorption in the range from about 600 nm to about 650 nm than does the second cleaning agent, the transmission capability of both cleaning agents in the near IR range above about 800 nm is not substantially different. This is also the case where the curves 10, 12 exhibit a noticeable drop at about 1000 nm or just below. Even in the region of the local transmission minimum at that point, the absolute values of the transmission capability of the two cleaning agents do not differ considerably, at least not compared to the difference which the two cleaning agents exhibit in the range between about 600 nm and about 650 nm.

After the considerable drop in the transmission capability in the yellow-green range, the transmission capability of the first cleaning agent increases again towards blue wavelengths, wherein it reaches a local maximum at roughly between about 450 nm and about 500 nm, which again does not differ, or at least does not differ in a similarly significant manner as in the yellow-green range, from the transmission capability of the second cleaning agent at those wavelengths.

A possible way, explained purely by way of example, to distinguish the first cleaning agent from the second cleaning agent is, therefore, to carry out separate transmission measurements at at least two wavelengths which are suitably chosen to allow conclusions to be drawn from the transmission values obtained at those wavelengths regarding the underlying cleaning agent in a particular case. For example, a first wavelength at which a transmission measurement is carried out could lie in the range in which the first cleaning agent exhibits a significant rise in absorption in the yellow-green range, that is to say, for example, between about 600 nm and about 650 nm. As reference, a transmission measurement could then be carried out at a second wavelength at which the transmission capability of the first and second cleaning agents does not differ substantially, or at least differs to a considerably lesser extent than in the yellow-green range. For example, such a second transmission measurement could be carried out in the IR range between about 800 nm and about 1100 nm. The relative ratio of the transmission value measured at the first wavelength to the transmission value measured at the second wavelength could then be calculated. The quotient so determined can give a reliable indication of whether the underlying cleaning agent was the first or the second cleaning agent. If, in reference to the exemplary curves of FIG. 1, the quotient of the transmission value in the yellow-green range to the transmission value in the IR range has a value of significantly less than 1, this is indicative of the first cleaning agent. If, on the other hand, the quotient has a value of 1 or even more than 1, this is indicative of the second cleaning agent.

By choosing a larger number of wavelengths at each of which a transmission measurement is carried out, the meaningfulness of the measured values can be increased and the reliability of the categorisation result (i.e. what type of cleaning agent is it?) can be improved. Again in reference to the exemplary transmission curves of FIG. 1, a third transmission measurement could be carried out at a wavelength in the visible blue range, where the transmission capability of the first cleaning agent has again substantially increased following its drop at yellow-green, that is to say, for example, between about 450 nm and about 500 nm. The transmission value measured at this third wavelength could in turn be related to one or more of the transmission values measured at the other wavelengths. In this manner, a set of several quotient values can be calculated, by means of which the type of cleaning agent can be determined.

It will be appreciated that the number of wavelengths at each of which a transmission measurement is carried out can be increased further. For example, it is conceivable to carry out transmission measurements at each of four, six or even eight wavelengths. The more wavelengths are considered in the transmission measurement, the higher the spectral resolution of the resulting transmission signature of the cleaning agent tested and the more precisely the type of cleaning agent can be determined.

Figure 2:
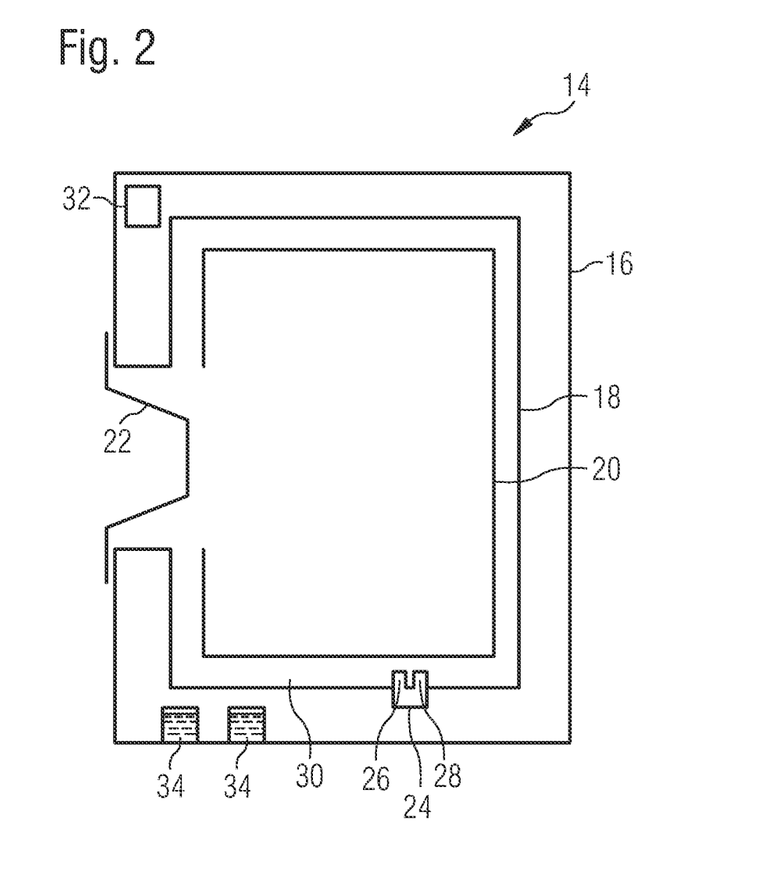
FIG. 2 shows, in highly schematic form, a domestic washing machine according to an exemplary embodiment.

Reference will now additionally be made to FIG. 2. The washing machine shown therein, which is designed for use in a private household, is designated generally 14. In the example shown, it is a machine of the front-loader type and comprises a machine housing 16, in which a liquor container 18 is accommodated. In the liquor container 18, a washing drum 20 is rotatably mounted about a horizontal axis of rotation. A door 22 attached in a hinged manner to the machine housing 16 serves to close and open an access to the interior of the washing drum 20.

For carrying out transmission-spectroscopic measurements on the washing liquor which collects in the liquor container 18 during operation of the washing machine 14 there is used an optical sensor (transmission sensor) 24, which projects with two sensor fingers 26, 28 into the interior—designated 30—of the liquor container 18 which is flushed by the liquor. The sensor 24, an exemplary construction of which will be explained in greater detail hereinbelow in connection with FIG. 4, generates wavelength-specific measuring light which leaves the sensor 24 at one of the sensor fingers 26, 28 in the direction towards the other sensor finger and passes through the liquor space 30 on the path between the two sensor fingers 26, 28. If washing liquor has collected in the liquor space 30, the measuring light is attenuated by the washing liquor on the part of the measurement path that extends through the liquor space 30. The amount of light arriving at the other sensor finger is evaluated in the sensor 24 in terms of intensity. The degree of attenuation, and consequently the transmission or absorption of the washing liquor, can be determined from the ratio between the emitted intensity and the received intensity. The sensor 24 carries out this transmission determination separately for different wavelengths of the measuring light, for which purpose it transmits measuring light of a different wavelength (or, more generally, of a different spectral component) onto the measurement section between the two sensor fingers 26, 28. For example, the sensor 24 can be configured to alternately transmit blue measuring light, green or yellow-green measuring light and IR measuring light onto the measurement section between the two sensor fingers 26, 28. In the exemplary embodiment explained here, the sensor 24 consequently does not emit broadband measuring light, which would contain spectral components from blue into the IR range, into the washing liquor to be measured. Instead, the emitted measuring light is colour-limited, wherein the sensor is configured to emit different light colours. This makes it possible to use a broadband detector on the receiver side, wherein any spectrally different detection sensitivity of the light detector can be taken into consideration, for example, by software in an evaluation program.

The washing machine 14 additionally has a control device 32 which controls the operation of the washing machine 14 (including the sensor 24). In the example shown in FIG. 2, the control device 32 is shown in schematic form as a single functional block, but the functions of the control device 32 can easily be allocated to different, separately arranged control sub-devices (in this connection, see also the explanations relating to FIG. 3 hereinbelow).

Also shown in FIG. 2 are storage receptacles 34, each of which is able to store an amount of a laundry cleaning agent. For example, one of the storage receptacles 34 can serve to store a heavy-duty detergent and another of the storage receptacles 34 can serve to store a colour detergent or a mild detergent. It will be appreciated that the representation of a total of two storage receptacles 34 depicted in FIG. 2 is merely by way of example and that any other number of storage receptacles 34 is possible (e.g. a single storage receptacle 34 or more than two storage receptacles 34). Each of the storage receptacles 34 is sufficiently large to receive an amount of cleaning agent that is sufficient for a large number of operating cycles of the washing machine 14. The washing machine 14 can contain a dosing device, not shown in greater detail in FIG. 2, which can be controlled by the control device 32 and by means of which cleaning agent can be removed from the storage receptacles 34 and introduced into the liquor container 18 in a dosed manner without the assistance of the user.

Although the manufacturer may specify to the user which type of cleaning agent he should introduce into which of the storage containers 34 or how the storage containers 34 with the different types of cleaning agent should be arranged in the washing machine 14, it can nevertheless not be ruled out that the user, by mistake, will introduce the storage containers 34 into the washing machine 14 in the incorrect arrangement or fill them with a different type of cleaning agent to that intended. The control device 32 can therefore be designed not only to control the dosed addition of cleaning agent from the storage receptacles 34 into the liquor container 18, but also to carry out a detection of the particular type of cleaning agent during the dosed addition. For example, the control device 32 could first introduce a given, comparatively small amount of cleaning agent from a first of the storage receptacles 34 into the liquor container in a metered manner and carry out a type detection by means of the sensor 24. The control device 32 could then effect a dosed addition of a defined amount of cleaning agent from a second of the storage receptacles 34 and check, by means of transmission spectroscopy, whether and in what way the transmission signature of the liquid medium contained in the liquor container 18 changes. On the basis of such changes in the transmission signature, the control device 32 could be able to conclude what type of cleaning agent is in the second storage receptacle 34. Instead of a single sensor 24 associated with the liquor container 18, the washing machine in other embodiments can comprise separate transmission sensors which are each associated with one of the storage receptacles 34 and project with their sensor fingers 26, 28 into a feed hose, for example, via which the storage receptacle 34 in question is coupled with the liquor container 18.

Figure 3:
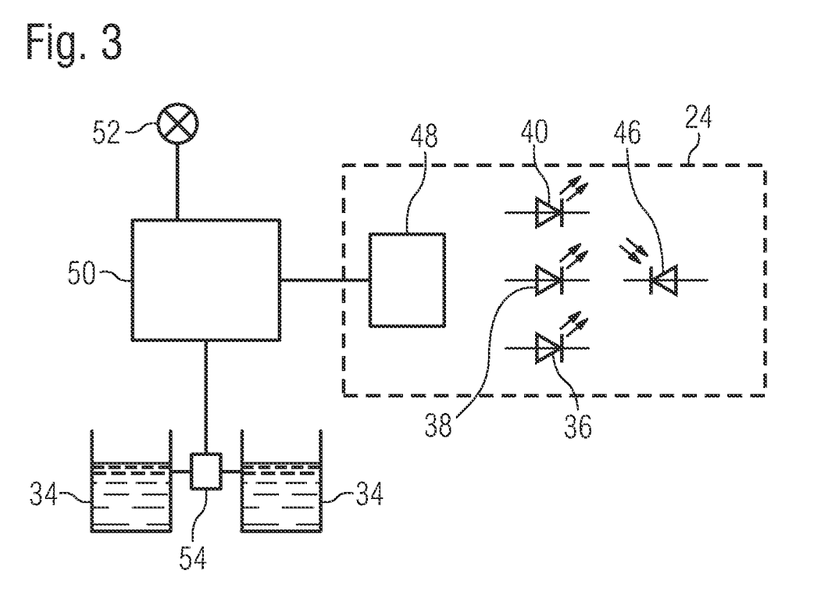
FIG. 3 shows, in schematic form, an electric circuit diagram of components of a domestic cleaning appliance according to an exemplary embodiment.
Figure 4:
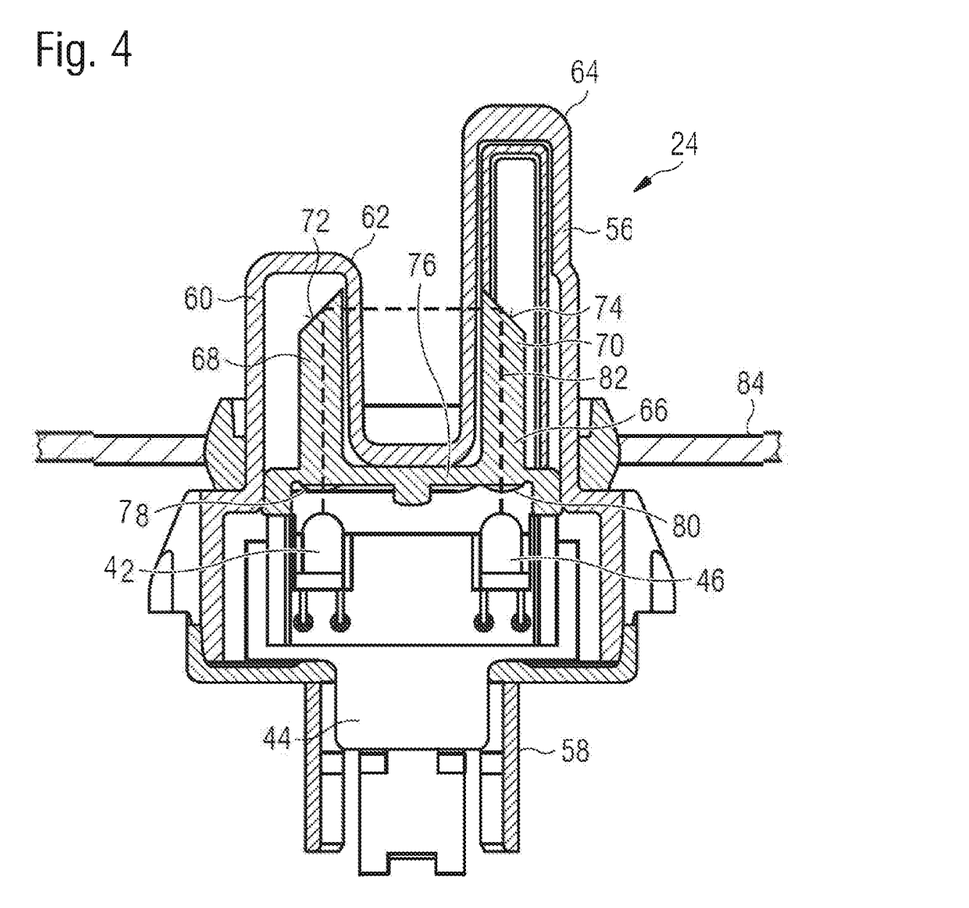
FIG. 4 shows a sectional view through an optical sensor according to an exemplary embodiment.

Reference will now additionally be made to FIGS. 3 and 4. The transmission sensor 24 is shown in FIG. 3 with a total of three light transmitters 36, 38, 40, which can each be in the form of a light-emitting diode and which can each emit light of a different colour (visible, UV or IR). The light transmitters 36, 38, 40 can be structurally combined in a common light-emitting diode component 42 (FIG. 4), which can be mounted on a printed circuit board 44 (again FIG. 4). The various light transmitters 36, 38, 40 can each be formed by a separate light-emitting diode chip, so that the light-emitting diode component 42 contains in total a plurality of such light-emitting diode chips. The light-emitting diode chips can be arranged in the light-emitting diode component 42 in straight line or in a two-dimensional array, for example. Such multichip light-emitting diode components, which are suitable for emitting different colours, are commercially available as such. The light-emitting diode component 42 is so configured that the individual light-emitting diode chips can be controlled individually, so that the light-emitting diode component 42 is able to radiate different colours as desired.

The transmission sensor 24 additionally comprises a light receiver 46 which is formed, for example, by a photodiode or a phototransistor. The light receiver is—as already explained—a broadband receiver which has sufficient sensitivity at each of the (main transmission) wavelengths emitted by the light transmitters 36, 38, 40 to deliver a detection signal which can meaningfully be processed. The light receiver 46 can also be mounted on the board 44.

In the example shown, the sensor 24 additionally comprises a processor 48 (FIG. 3) which is responsible for controlling and supplying power to the light transmitters 36, 38, 40 and receives the received signal (detection signal) of the light receiver 46. The processor 48 can determine measured values which are representative of the transmission at the wavelength in question from the incoming received signal. These measured values represent the spectral transmission signature of the tested medium.

In some embodiments, the processor 48 can itself evaluate the determined spectral transmission signature with regard to the categorisation of the tested medium, that is to say what type of cleaning agent it is. In other embodiments, the processor 48 can forward the spectral transmission signature, that is to say the underlying measured values, to a central control unit 50 (FIG. 3) of the washing machine or, generally, of the domestic cleaning appliance, wherein the central control unit 50 then performs the categorisation of the cleaning agent. If the processor 48 is itself designed to carry out the categorisation of the cleaning agent on the basis of the spectral transmission signature obtained, it delivers its categorisation result to the control unit 50, which controls the operation of the cleaning appliance on the basis of the categorisation result. The processor 48 and the control unit 50 are together part of the control device 32 of FIG. 2 or together form the control device. The processor 48 can be mounted on the same board 44 of the sensor 24 on which the light-emitting diode component 42 and the light receiver 46 are also mounted.

In dependence on the categorisation result, the control unit 50 can activate, for example, a visual or/and acoustic warning delivery unit 52 (FIG. 3), if the control unit 50 determines, for example, a combination of the set washing program and the detected cleaning agent type that has previously been specified as incorrect. For example, the setting of a delicate wash program in conjunction with the detection of a heavy-duty detergent can be specified beforehand as an incorrect combination (error combination). In this case, the control unit 50 can be adapted to give a corresponding warning to the user visually and/or acoustically. Alternatively or in addition, the control unit 50 can prevent the set washing program from being carried out.

If the cleaning appliance is equipped with a controllable dosing device for the automatic dosing of cleaning agent which is stored in one or more storage receptacles 34 (such a dosing device is shown in schematic form in FIG. 3 at 54), the control unit 50 can be adapted to control the dosing device 54 in dependence on the categorisation result. For example, the control unit 50 can determine, on the basis of the categorisation result, in which of a plurality of storage receptacles 34 a required cleaning agent is present and then, by means of the dosing device 54, remove a desired amount of the cleaning agent present therein from the "correct" storage receptacle 34.

FIG. 4 shows an exemplary detailed construction of the transmission sensor 24. The sensor 24 comprises a sensor housing (measurement housing) 56, which in the example shown is in two parts, composed of a housing bottom part 58 and a housing top part 60. The two housing parts 58, 60 are releasably connected together by a snap-fit connection, for example. The already mentioned printed circuit board (board 44), on which the light-emitting diode component 42 and the light receiver 46 are mounted, is accommodated in the sensor housing 56. The sensor housing 56 is formed in its housing top part 60 with two housing fingers 62, 64, which form the sensor fingers 26, 28 shown in FIG. 2.

A light-guiding body 66 of transparent material inserted into the sensor housing 56 is formed with two light-guiding fingers 68, 70, each of which projects into one of the housing fingers 62, 64. The light-guiding fingers 68, 70 have in the region of their free finger ends planar end faces 72, 74 oriented at an angle relative to the finger longitudinal direction, which serve to deflect a light beam guided in the respective light-guiding finger 68, 70. The two light-guiding fingers 68, 70 of the light-guiding body 66 are connected together by a disc-shaped base plate 76 of the light-guiding body 66, so that the light-guiding body 66 is a one-piece component which is consequently easy to handle.

There is formed on the base plate 76, in association with the light-emitting diode component 42, a collecting lens 78 which forms a light inlet point in the light-guiding body 66 for a light beam emitted by the light-emitting diode component 42. The collecting lens 78 effects collimation, in particular parallelisation, of the divergent light beam coming from the light-emitting diode component 42. After entering the light-guiding body 66, the light beam is guided in the light-guiding finger 68 by total reflection to the end face 72, where the light beam is deflected at a right angle by total reflection at the end face 72. The light beam then leaves the housing finger 62 and passes through the space between the housing fingers 62, 64 before entering the housing finger 64 and the light-guiding finger 70. At the end face 74 of the light-guiding finger 70, the light beam is again deflected at a right angle by total reflection and is guided in the light-guiding finger 70 by total reflection in the direction towards a further collecting lens 80, which is formed on the base plate 76 of the light-guiding body 66 and constitutes a light outlet point for the light beam. The collecting lens 80 concentrates the light beam emerging from the light-guiding body 66 at the light receiver 46.

The path of the light beam from the light-emitting diode component 42 to the light receiver 46 is shown in FIG. 4 by a broken line 82. Along this path (measurement path), the light beam passes through two light inlet points and two light outlet points of the light-guiding body 66. A first light inlet point is—as explained—formed by the collecting lens 78. After being deflected at the end face 72, the light beam emerges from the light-guiding finger 68; the outlet point there forms a first light outlet point. After the light beam has left the housing finger 62 and entered the housing finger 64, it enters the light-guiding finger 70. The inlet point at the light-guiding finger 70 forms a second light inlet point. Finally, the collecting lens 80 forms a second light outlet point.

FIG. 4 shows an installation situation in which the sensor 24 is installed in a wall portion 84. The wall portion 84 is, for example, part of a bottom wall of the liquor container 18 of FIG. 2. Alternatively, the wall portion 84 can be part of a feed line through which a cleaning agent in pure form or in the form of a mixture with water is guided to the liquor container 18. The sensor 84 is so installed in the wall portion 84 that the space between the housing fingers 62, 64 is flushed by the liquid to be tested. The embodiment with the light-guiding body 66 ensures that, regardless of the light colour currently being emitted, the measuring light always passes through the same measuring spot, so that location-dependent concentration variations of the cleaning agent do not have any influence on the measurement results. In terms of time, the light-emitting diode component 42 is switched sufficiently quickly between the different light colours that any short-term concentration variations of the cleaning agent likewise have no or at least no relevant influences on the measurement results. For example, the light colour of the light-emitting diode component 42 can be changed with a clock frequency between about 10 and about 1000 Hz.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A domestic laundry-washing appliance comprising:
an optical measuring device adapted to derive measured values which are representative of a spectral transmission signature of a washing liquid used during operation of the laundry-washing appliance for cleaning textiles; and
a control device adapted to categorise a cleaning agent contained in the washing liquid in respect of its chemical properties on the basis of the spectral transmission signature, and to control the operation of the laundry-washing appliance in dependence on the categorisation result, wherein the control device is adapted to categorize a cleaning agent contained in the washing liquid in respect of the presence of at least one of an optical brightener and a bleaching agent on the basis of the spectral transmission signature.

2. The domestic laundry-washing appliance according to claim 1, wherein the control device is adapted to classify a cleaning agent contained in the washing liquid into one of a plurality of cleaning agent categories on the basis of the spectral transmission signature, wherein the cleaning agent categories include at least the categories heavy-duty detergent and colour detergent.

3. The domestic laundry-washing appliance according to claim 1, wherein the control device is adapted to categorise a cleaning agent contained in the washing liquid in respect of its chemical properties on the basis of the relative amplitude ratio of different spectral components of the spectral transmission signature.

4. The domestic laundry-washing appliance according to claim 1, wherein the control device is adapted to test the spectral transmission signature obtained in respect of the presence or absence of a significant local amplitude trough in at least one of the visible wavelength range and an ultraviolet wavelength range and to categorise a cleaning agent contained in the washing liquid in dependence on the presence or absence of such a significant local amplitude trough.

5. The domestic laundry-washing appliance according to claim 1, wherein the control device is adapted to relate the categorisation result to the type of wash program set on the laundry-washing appliance by a user and to effect a predetermined error action if the combination of the categorisation result and the set program type is determined by the control device to be an error combination.

6. The domestic laundry-washing appliance according to claim 5, wherein the predetermined error action comprises at least one of the following actions: delivery of a visual warning, delivery of an acoustic warning, interruption, termination or prevention of the performance of the set wash program.

7. The domestic laundry-washing appliance according to claim 1, wherein the control device is adapted to control a dosing operation for at least one cleaning agent on the basis of the categorisation result.

8. The domestic laundry-washing appliance according to claim 1, wherein, in order to derive the spectral transmission signature, the optical measuring device is adapted to determine, for each of at least one of a plurality of wavelengths and a plurality of wavelength ranges, a measured value which is representative of the optical transmission of the washing liquid at the wavelength or wavelength range in question.

9. The domestic laundry-washing appliance according to claim 1, wherein the optical measuring device comprises a plurality of individually controllable, different coloured light transmitters and a light detector arranged to detect the light of each of the light transmitters, wherein the control device is adapted to control the light transmitters to emit light in a temporally offset manner relative to one another and to determine the spectral transmission signature of the washing liquid on the basis of the detection values of the light detector.

10. The domestic laundry-washing appliance according to claim 9, wherein all the light transmitters of the plurality of light transmitters have a mutual spectral distance of their main transmission wavelength of at least 80 nm or at least 100 am or at least 150 am.

11. The domestic laundry-washing appliance according to claim 9, wherein the plurality of light transmitters comprises a light transmitter whose main transmission wavelength lies in an infra-red wavelength range starting at about 780 am.

12. The domestic laundry-washing appliance according to claim 9, wherein the plurality of light transmitters comprises a light transmitter whose main transmission wavelength lies in an ultraviolet wavelength range up to about 380 am.

13. The domestic laundry-washing appliance according to claim 9, wherein the plurality of light transmitters comprises at least one light transmitter whose main transmission wavelength lies in a visible wavelength range between about 380 nm and about 780 nm.

14. The domestic laundry-washing appliance according to claim 13, wherein the plurality of light transmitters comprises two light transmitters whose main transmission wavelengths each lie at a different location in the visible wavelength range.

15. The domestic laundry-washing appliance according to claim 9, wherein at least two light transmitters of the plurality of light transmitters are mutually spectral overlap-free.

16. The domestic laundry-washing appliance according to claim 9, wherein at least two light transmitters of the plurality of light transmitters are combined in a multichip light-emitting diode component.

17. The domestic laundry-washing appliance according to claim 9, wherein the optical measuring device comprises:
- a measurement housing which projects into a flushing space for the washing liquid;
- a printed circuit board arrangement which is arranged in the measurement housing and on which the plurality of light transmitters and the light receiver are mounted; and
- a light-guiding structure which is arranged in the measurement housing and made of a transparent material and which defines at least one first light inlet point, a first light outlet point, a second light inlet point and a second light outlet point,
- wherein the plurality of light transmitters is so arranged relative to the light-guiding structure that the light of the plurality of light transmitters enters the light-guiding structure at the at least one first light inlet point and is guided therein to the first light outlet point,
- wherein the light-guiding structure defines a light-measurement path which extends from the first light outlet point to the second light outlet point and, from there, inside the light-guiding structure to the second light outlet point,
- wherein the light-measurement path extends through the flushing space outside the measurement housing on a portion lying between the first light outlet point and the second light inlet point,
- wherein the light receiver is so arranged relative to the light-guiding structure that light emerging from the light-guiding structure at the second light outlet point strikes the light receiver.

18. The domestic laundry-washing appliance according to claim 17, wherein the light-guiding structure has a first light inlet point which is common to all the light transmitters of the plurality of light transmitters.

19. The domestic laundry-washing appliance according to claim 17, wherein the light-guiding structure has a plurality of separate first light inlet points, each of which is associated with at least one different light transmitter of the plurality of light transmitters.

20. A domestic dishwasher comprising:
- an optical measuring device adapted to derive measured values which are representative of a spectral transmission signature of a cleaning liquid used during operation of the dishwasher for cleaning dishes; and
- a control device adapted to categorise a cleaning agent contained in the cleaning liquid in respect of its chemical properties on the basis of the relative amplitude ratio of different spectral components of the spectral transmission signature, and to control the operation of the dishwasher in dependence on the categorisation result.

21. An optical sensor for installation in a water-bearing domestic cleaning appliance, the optical sensor comprising:
- an optical measuring device adapted to derive measured values which are representative of a spectral transmission signature of a cleaning liquid to be used during operation of the cleaning appliance, wherein the optical measuring device comprises a plurality of individually controllable, different coloured light transmitters and a light detector arranged to detect the light of each of the light transmitters; and
- a processor adapted to categorise a cleaning agent contained in the cleaning liquid in respect of its chemical properties on the basis of the spectral transmission signature, and to provide a corresponding categorisation result, wherein the processor is adapted to control the light transmitters to emit light in a temporally offset manner relative to one another and to determine the spectral transmission signature of the washing liquid on the basis of the detection values of the light detector.

\* \* \* \* \*